(12) United States Patent
Dikmenli

(10) Patent No.: US 9,416,792 B2
(45) Date of Patent: Aug. 16, 2016

(54) ELECTRICAL MACHINE HAVING A FAN WHEEL

(75) Inventor: Erdogan Dikmenli, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 884 days.

(21) Appl. No.: 13/703,128

(22) PCT Filed: May 12, 2011

(86) PCT No.: PCT/EP2011/057661
§ 371 (c)(1),
(2), (4) Date: Dec. 10, 2012

(87) PCT Pub. No.: WO2011/154210
PCT Pub. Date: Dec. 15, 2011

(65) Prior Publication Data
US 2013/0078102 A1    Mar. 28, 2013

(30) Foreign Application Priority Data
Jun. 9, 2010    (DE) .......................... 10 2010 029 836

(51) Int. Cl.
| | |
|---|---|
| *B29C 45/14* | (2006.01) |
| *F04D 29/28* | (2006.01) |
| *F04D 29/26* | (2006.01) |
| *H02K 9/06* | (2006.01) |
| *B29L 31/08* | (2006.01) |

(52) U.S. Cl.
CPC ........ *F04D 29/281* (2013.01); *B29C 45/14311* (2013.01); *F04D 29/263* (2013.01); *H02K 9/06* (2013.01); *B29C 2045/14327* (2013.01); *B29L 2031/08* (2013.01); *Y10T 29/49336* (2015.01)

(58) Field of Classification Search
CPC ... F04D 29/281; F04D 29/263; F04D 29/388; F04D 29/2222; F04D 29/2227; F05D 2230/30; F05D 2230/24; B29C 45/14311; B29C 2045/14327; H02K 9/06; B29L 2031/08
See application file for complete search history.

(56) References Cited

U.S. PATENT DOCUMENTS

| | | | |
|---|---|---|---|
| 3,659,471 A | 5/1972 | Marsch | |
| 4,762,465 A * | 8/1988 | Friedrichs | ........... F04D 29/2227 415/217.1 |
| 4,957,414 A | 9/1990 | Willingham | |
| 5,655,882 A * | 8/1997 | Morgan | ................ F04D 29/325 416/204 R |
| 5,977,668 A | 11/1999 | Yoshioka | |
| 2001/0010434 A1 | 8/2001 | Ishida et al. | |
| 2005/0106024 A1 | 5/2005 | Vasilescu et al. | |
| 2007/0024131 A1 | 2/2007 | Rouleau et al. | |

FOREIGN PATENT DOCUMENTS

| | | |
|---|---|---|
| DE | 69201498 | 7/1995 |
| JP | 2001333558 | 11/2001 |

OTHER PUBLICATIONS

International Search Report for Application No. PCT/EP2011/057661 dated Jul. 2, 2012 (6 pages).

* cited by examiner

*Primary Examiner* — Dwayne J White
*Assistant Examiner* — Danielle M Christensen
(74) *Attorney, Agent, or Firm* — Michael Best & Friedrich LLP

(57) ABSTRACT

The invention relates to an electrical machine having a fan wheel which comprises an injection-moulded blade carrier ring with fan blades as well as an annular insertion part which is integrated into the blade carrier ring and which comprises passage openings via which the blade carrier ring is connected to the fan blades.

16 Claims, 5 Drawing Sheets

ELECTRICAL MACHINE HAVING A FAN WHEEL

BACKGROUND OF THE INVENTION

The invention relates to an electrical machine having a fan impeller.

AC generators for motor vehicles which are cooled with the aid of a fan impeller during operation in order to be able to maintain a temperature at which optimum power is ensured are known. A generator of this kind which is provided with a fan impeller is described, for example, in DE 692 01 498 T2. The fan impeller which is known from said document comprises an annular metal insert part and a blade support ring which is in the form of a molded plastic part and has fan blades. The blade support ring is formed on the metal insert part which has a central recess in order to be mounted on a shaft. The annular insert part is virtually completely surrounded by the plastic of the blade support ring, this having the disadvantage that, on account of the insulating properties, heat cannot be effectively dissipated, this heat spreading from the shaft on which the fan ring is seated.

U.S. Pat. No. 5,977,668 discloses an AC generator having a fan impeller which has a plastic blade support ring with fan blades formed on it and also has a metal insert part which forms a hub in order to be mounted on a shaft, with the plastic blade support ring forming the radially outer part and the insert part forming the radially inner part of the fan impeller. In this embodiment, care should be taken that there is sufficient adhesion between the plastic of the blade support ring and the metal of the insert part even with changing external conditions, in particular at different temperatures. It is necessary to ensure that, for example in the event of changes in temperature, the blade support ring does not accidently become detached from the insert part.

SUMMARY OF THE INVENTION

The invention is based on the problem of ensuring efficient cooling in an electrical machine even under changing operating conditions.

The electrical machine is, in particular, a generator in a motor vehicle, preferably an AC generator or three-phase generator. However, electric motors, in particular in motor vehicles, may also be suitable in principle.

The electrical machine has a fan impeller for cooling purposes, said fan impeller being arranged on a shaft of the electrical machine and rotating with the shaft. The rotating fan impeller generates an air stream which makes a significant contribution to cooling the electrical machine.

The fan impeller of the electrical machine has a blade support ring which is produced in an injection-molding process and has a series of fan blades and an annular insert part which is integrated in the blade support ring. The annular insert part is encapsulated by the material of the blade support ring in order to produce the fan impeller. In this way, the insert part can be integrated in the blade support ring in a single working step and the blade support ring, including the fan blades, can be produced by injection-molding.

The insert part is preferably composed of metal or sheet metal, and is, in particular, a stamped component which is stamped out of a corresponding template. However, other materials are suitable for the insert part in principle, said insert part lending the fan impeller an improved degree of stability. In order to ensure this, the insert part is expediently composed of a different material to the blade support ring and has, in particular, a higher degree of stability or strength.

Passage openings are made in the insert part, the material of the blade support ring which is introduced in the plastic injection-molding process spreading through said passage openings in order to form the fan blades. This has the advantage over sheet metal fans that an increased number of blades and complex blade geometries can be realized, as a result of which the delivery volume of the fan is increased, In addition, the dissipation of heat can be optimized.

A preferably annular main body of the blade support ring on one end face of the insert part can be connected to the fan blades which are arranged on the other end face of the insert part via the passage openings, so that the main body, the insert part having the passage openings, and the fan blades are arranged axially one behind the other. This ensures the one-piece design between the main body of the blade support ring and the fan blades. In particular, it is possible to produce the blade support ring with the main body and fan blades in a single injection-molding process by the material of the blade support ring being introduced into a mold or die, which accommodates the insert part, during the injection-molding process, it being possible for the material to spread through the passage openings in the insert part on both sides of the insert part.

Various advantages are achieved with this design. Firstly, it provides a secure, interlocking connection between the blade support ring and the insert part which is located between the various parts of the blade support ring—the annular main body on one end face and the fan blades on the opposite end face. The interlocking connection is made both in the radial direction and in the axial and circumferential direction. As a result, the mechanical strength of the connection is considerably improved, and it continues to be ensured, even in the case of changes in temperature, that the blade support ring having the main body and the fan blades cannot become detached from the insert part.

The smallest inside diameter of the insert part can be designed to be smaller than the smallest inside diameter of the blade support ring. In particular in the case of a design of the insert part from a material with a better degree of conductivity than the injection-molded blade support ring, good heat dissipation is ensured, starting from the shaft on which the fan impeller is mounted, radially outward by means of the insert part. Therefore, this produces a possibly interrupted ring region on the insert part between the inside diameter of the insert part, which inside diameter delimits the central recess, and the inside diameter of the blade support ring which is larger, said ring region being free of the material of the blade support ring, so that good heat emission is ensured in this region.

Heat emission can be further improved by the surface of only that end face of the insert part which is situated opposite the fan blades being covered by the material of the blade support ring. In contrast, adjacent fan blades on the fan blade side are not directly connected to one another, so that the end face of the insert part is exposed on the fan blade side between the fan blades and likewise ensures improved heat emission.

According to an expedient development, provision is made for the blade support ring to surround the radially outer circumferential face of the insert part. The main body of the blade support ring extends radially beyond the circumferential face of the insert part and is also located on the circumferential face, so that the radial interlocking connection between the blade support ring and the insert part is further improved. Coaxial orientation of the blade support ring and the insert part is also ensured with a greater degree of accuracy.

Furthermore, it may be advantageous to provide an interlocking geometry which is covered by the blade support ring on the radially outer circumferential face of the insert part. The interlocking geometry has, for example, radial indentations and/or projections which are filled with or, respectively, surrounded by the material of the blade support ring. In the case of indentations, this can, for example, be in the form of triangular notches. This provides an improved interlocking connection between the blade support ring and the insert part in the circumferential and radial direction. The indentations form gaps between the projections. The circumferential face of the insert part can be formed in the manner of an external tooth system, with the gaps between the teeth forming the indentations and the teeth forming the projections.

The passage openings are expediently located immediately in the region of the fan blades which are injected through the passage openings. Two passage openings are preferably located one behind the other in the insert part, both said passage openings being associated with a common fan blade. The fan blade covers the passage opening or openings completely, with the fan blades having a larger cross section than the associated passage openings, as a result of which a more secure interlocking connection is provided in the axial direction, and the fan blades or the main body of the blade support ring are prevented from lifting off from the insert part.

Heat dissipation by means of the insert part can be further improved by the inside diameter of the blade support part being at least twice as high as the inside diameter of the insert part. This ensures that a ring strip on the insert part which directly adjoins the central recess is free of the material of the blade support ring over a significant radial width.

The fan impeller according to the invention is used in an electrical machine, in particular in a motor vehicle. In the method for producing the fan impeller for an electrical machine, the insert part, which is preferably designed as a stamped part, is inserted into the mold or the die, the material of the blade support ring is then preferably injected on that side of the insert part which is averted from a stamped burr on the insert part in an injection-molding process. The plastic spreads over the passage openings in the insert part and can form the fan blades. Injection in the stamping direction of the insert part ensures that the flow of plastic through the stamped burr on the insert part is not negatively influenced.

BRIEF DESCRIPTION OF THE DRAWINGS

Further advantages and expedient embodiments can be gathered from the further claims, the description of the figures and the drawings, in which:

DETAILED DESCRIPTION

Figure 1:
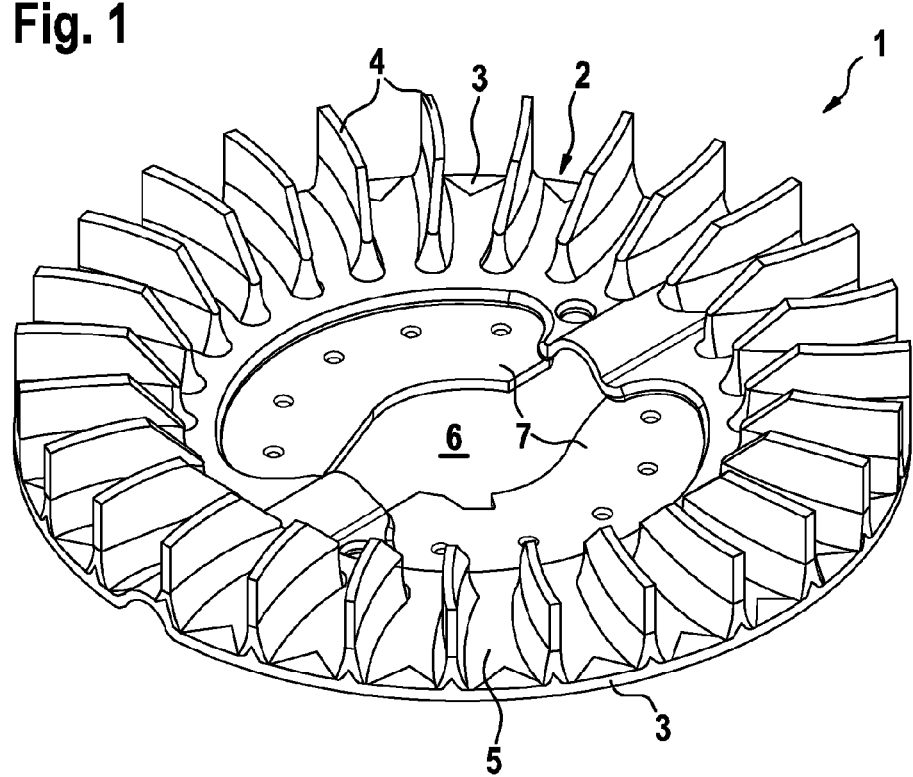
FIG. 1 shows a perspective view of a fan impeller for an electrical machine, comprising a plastic blade support ring having fan blades and an annular insert part which is partially encapsulated by the plastic of the blade support ring.
Figure 2:
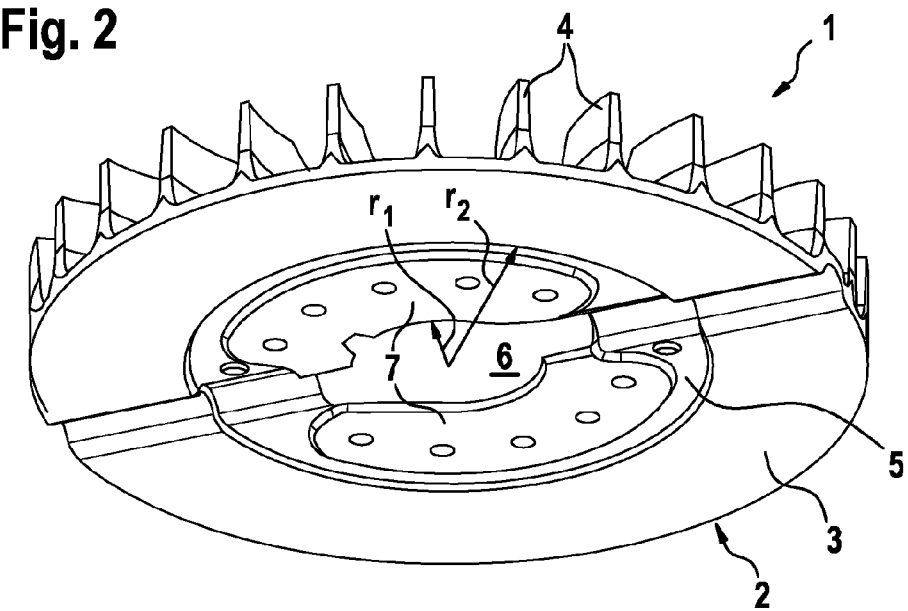
FIG. 2 shows a perspective view of the fan impeller from below.

In the figures, identical components are provided with the same reference signs.

FIGS. 1 to 6 show a fan impeller 1 for an electrical machine, having a plastic blade support ring 2 having a main body 3 and fan blades 4 and an insert part 5. The blade support ring 2 is mounted on the insert part 5 using an injection-molding process, said insert part being designed as a stamped part and being produced, in particular, for sheet metal or metal. Both the main body 3 of the blade support ring 2 and the insert part 5 are annular and are oriented coaxially to one another and surround a central recess 6 by means of which the fan impeller 1 is mounted on a supporting shaft. The central recess 6 is bounded directly by boundary sections 7 which are integrally formed with the insert part 5.

The main body 3 of the plastic blade support ring 2 is annular and covers the lower face of the insert part 5 which is situated opposite the blade side, in an annular strip. In addition, the main body 3 extends as far as the radially outer circumferential face of the insert part and surrounds the circumferential face, with the insert part 5 having an outside diameter which is larger than the inside diameter of the fan blades 4. The outside diameter of the insert part 5 is preferably at least approximately the same as the outside diameter of the fan blades 4. The circumferential face of the insert part 5 has triangular indentations which are likewise filled by the plastic material of the main body 3 of the blade support ring.

The main body 3 and the fan blades 4 are located substantially on opposite sides of the insert part 5 and are integrally formed. To this end, the plastic material is injected into a die, in which the insert part 5 is inserted, in the injection-molding process, with the plastic material passing through the passage openings in the insert part 5 and forming the blades 4.

Figure 3:
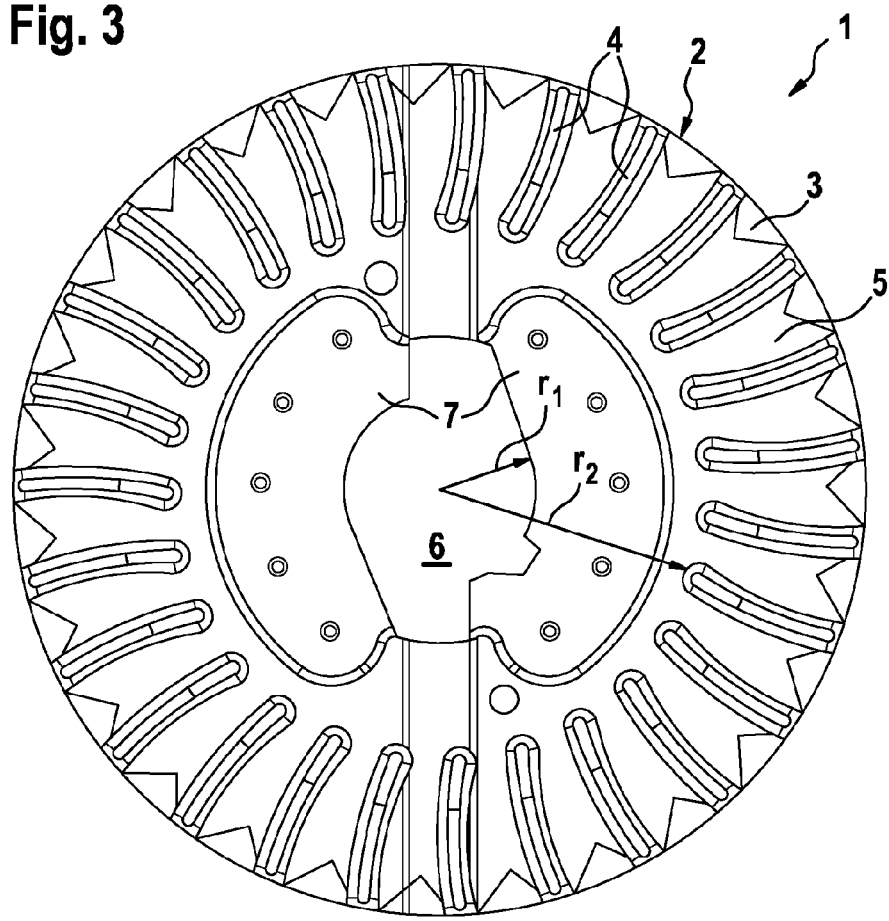
FIG. 3 shows a plan view of the fan impeller.
Figure 4:
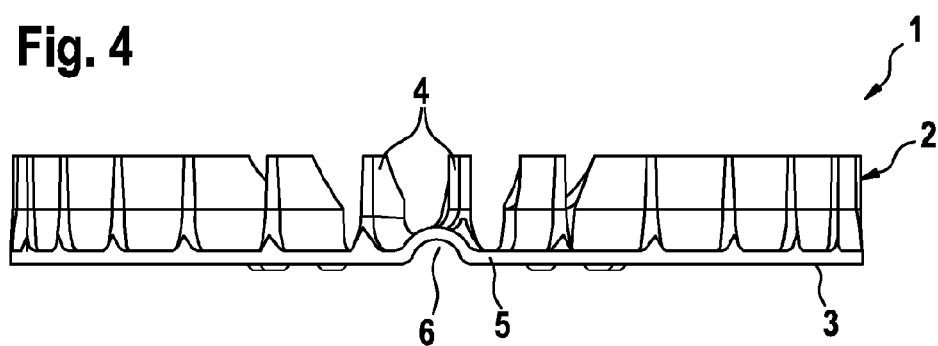
FIG. 4 shows a side view of the fan impeller.
Figure 5:
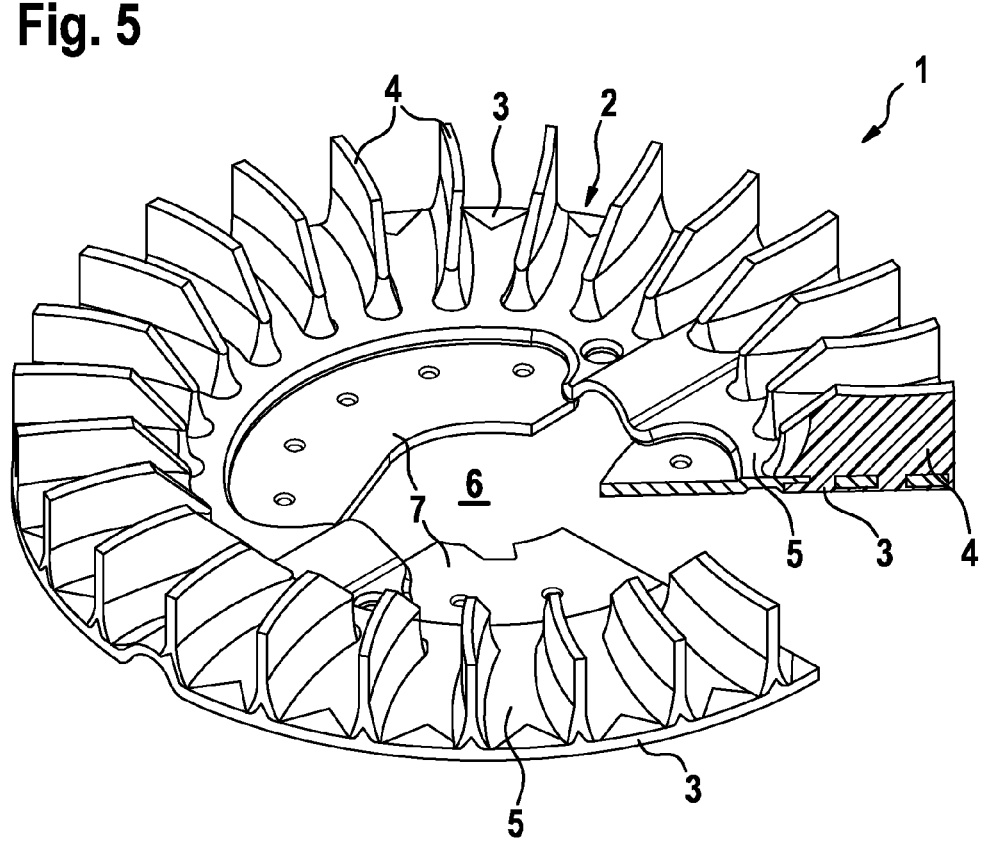
FIG. 5 shows a perspective illustration of the fan impeller similar to that in FIG. 1, but with a segment cut out.
Figure 6:
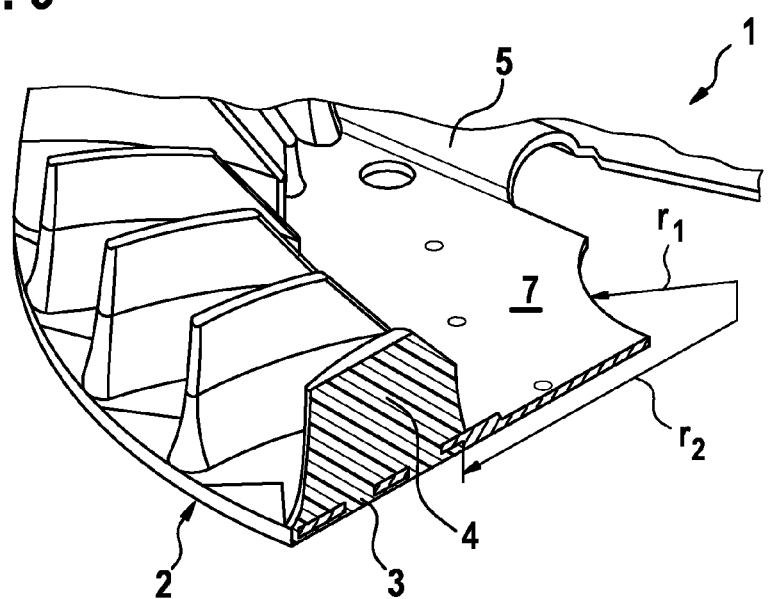
FIG. 6 shows an enlarged illustration of a cut edge through the fan impeller.
Figure 7:
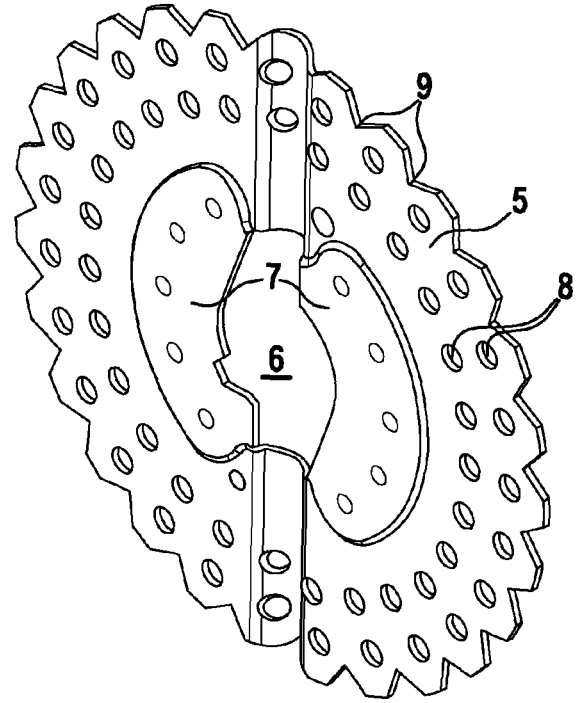
FIG. 7 shows a perspective illustration of the insert part on its own.
Figure 8:
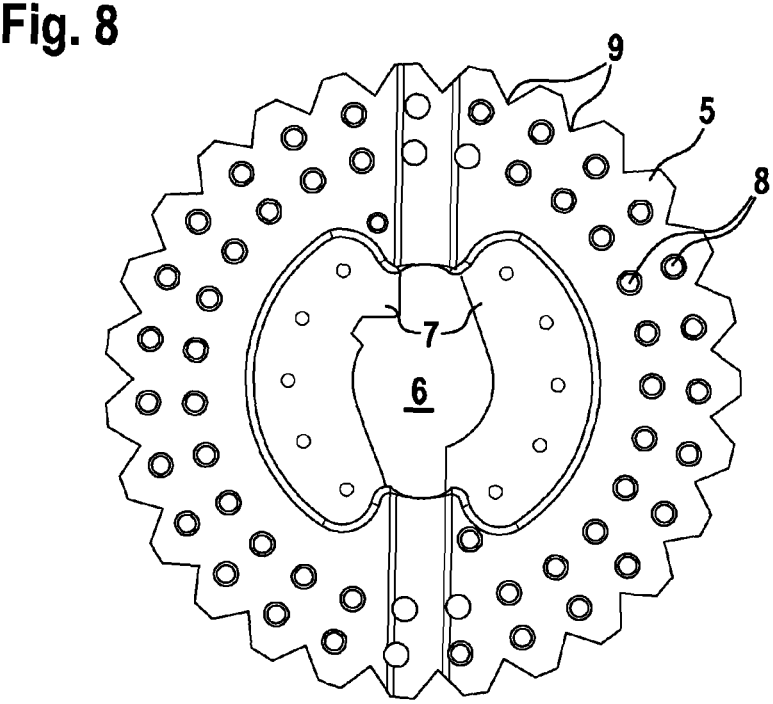
FIG. 8 shows a plan view of the insert part.

The annular main body 3 of the blade support ring 2 on the rear face of the insert part 5 has an inside radius $r_2$ (FIG. 2, FIG. 6), whereas the insert part 5 has a minimum inside radius $r_1$ in the region of the inner boundary sections 7 which is significantly smaller than the inside radius $r_2$ of the main body 3. The same applies for the fan blades 4 on the front face of the insert part 5, said fan blades having an inside radius which may be identical to the inside radius $r_2$ of the main body 3 (FIG. 3, FIG. 6). The two boundary sections 7 of the insert part 5, which are in the form of part of a ring, and a strip of the insert part 5, which radially adjoins said boundary sections and extends radially between the boundary sections 7 and the inside radius of the fan blades 4, are therefore free of the plastic material of the blade support ring, as a result of which good heat emission is ensured in this region. The fan blades 4 extend at least approximately in the radial direction and cover in each case two passage openings 8 which are made in the insert part 5 and are situated radially one behind the other, as shown in FIGS. 7 and 8. The passage openings 8 in the insert part 5 have a circular cross section, with, however, non-round cross-sectional shapes, for example designed as elongates holes, also being suitable in principle. In the finished state, the base of each fan blade 4 covers the two associated passage openings 8 completely. The connection between the main body 3 and the fan blades 4 is established via the passage openings 8.

It is also possible, in principle, for only one or a large number of passage openings to be provided for each fan blade, the plastic material being injected through said passage openings during the production process. The passage openings 8 additionally have an interlocking connection function since a fixed connection between the blade support ring 2 and the insert part 5 in the radial direction, axial direction and circumferential direction is ensured on account of the one-piece design of the annular main body 3 on one side of the insert part 5 and fan blades 4 on the other side of the insert part.

FIGS. 7 and 8 also show that the circumferential edge of the insert part 5 is provided with triangular notches 9 which, in the finished state, are filled by the material of the plastic body. This is shown, for example, in FIGS. 1, 3 and 5.

Figure 9:
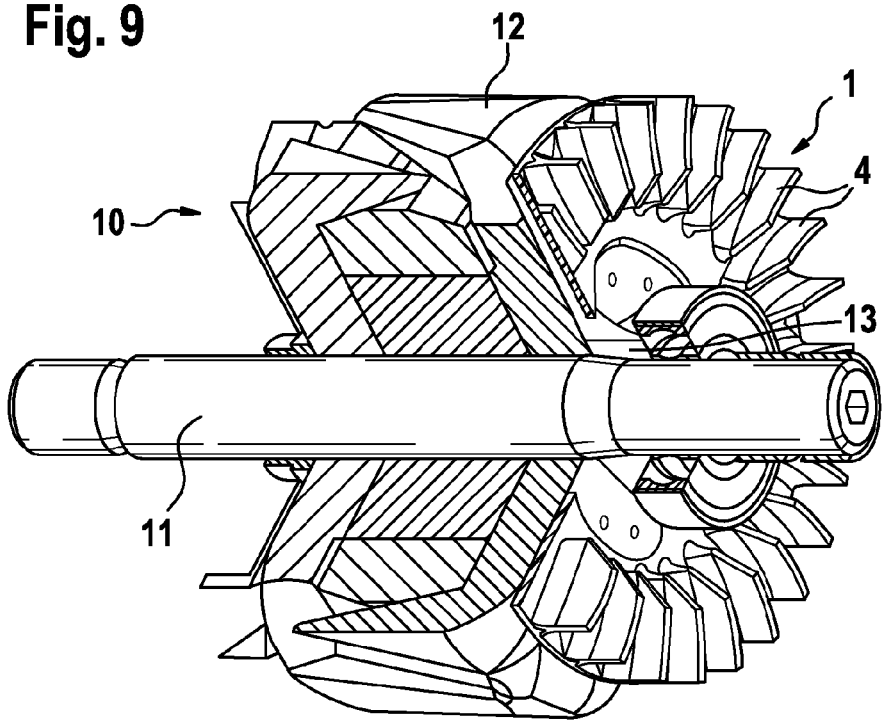
FIG. 9 shows a perspective illustration of a rotor of an electrical machine having a fan impeller arranged on the end face.
Figure 10:
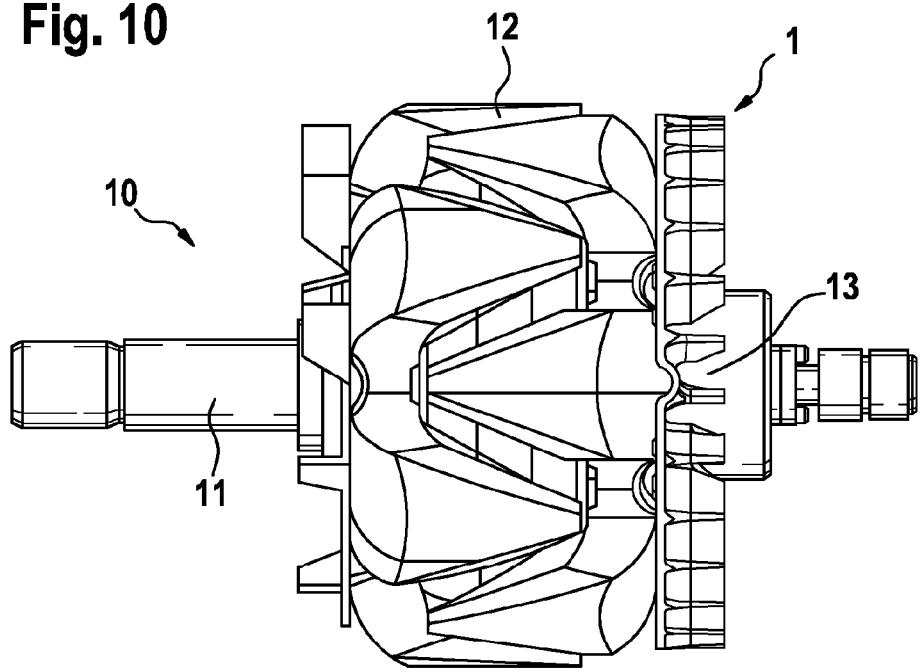
FIG. 10 shows a side view of the rotor from FIG. 9.

FIGS. 9 and 10 show part of an electrical machine which comprises a rotor 10 having a shaft 11 and a pair 12 of claw poles which are pushed onto the shaft. The fan impeller 1 is pushed directly onto the pair 12 of claw poles or onto the iron part and then onto the shaft 11 and connected thereto in a rotationally fixed manner. The connection between the fan impeller 1 and the shaft 11 is established by means of a hub 13 which is mounted on the shaft 11 and to which the fan impeller 1 is fixedly connected, for example welded, in the region of the boundary sections 7 of the insert part 5.

In addition or as an alternative to connection by means of the hub 13, the fan impeller 1 can also be axially fixed to the iron part, for example the pair 12 of claw poles, for example by means of a welded connection. To this end, weld points or projections are provided on the end face of the boundary section 7.

The invention claimed is:

1. An electrical machine having a fan impeller, having at least one injection-molded blade support ring having fan blades (4) and an annular insert part (5) which is integrated in the blade support ring (2), characterized in that passage openings (8) are made in the insert part (5), the blade support ring (2) being connected to the fan blades (4) via said passage openings, wherein a main body (3) of the blade support ring (2), the insert part (5), and the fan blades (4) are arranged axially one behind the other, and wherein adjacent fan blades (4) are not directly connected to one another on a fan blade side of the blade support ring (2) so that an end face of the annular insert part (5) is exposed between the adjacent fan blades (4).

2. The electrical machine as claimed in claim 1, characterized in that a smallest inside radius ($r_1$) of the insert part (5) is smaller than a smallest inside radius ($r_2$) of the blade support ring (2).

3. The electrical machine as claimed in claim 1, characterized in that the fan blades (4) each have a radial extent and rest on an end face of the insert part (5) over the entire radial extent.

4. The electrical machine as claimed in claim 1, characterized in that a surface of an end face of the insert part (5) which is situated opposite the fan blades (4) is covered by material of the blade support ring (2).

5. The electrical machine as claimed in claim 1, characterized in that the blade support ring (2) surrounds a radially outer circumferential face of the insert part (5).

6. The electrical machine as claimed in claim 1, characterized in that a radially outer circumferential face of the insert part (5) is provided with an interlocking geometry in the form of radial indentations (9) or projections, and the interlocking geometry is covered by the blade support ring (2).

7. The electrical machine as claimed in claim 6, characterized in that the indentations (9) are in the form of triangular notches.

8. The electrical machine as claimed in claim 1, characterized in that the fan blades (4) cover associated passage openings (8).

9. The electrical machine as claimed in claim 1, characterized in that two passage openings (8) are provided for each fan blade (4), said passage openings being made one behind the other in a radial direction in the insert part (5).

10. The electrical machine as claimed in claim 1, characterized in that the insert part (5) is a punched part.

11. The electrical machine as claimed in claim 10, characterized in that the fan blades (4) are arranged on a side of the insert part (5) which has a stamped burr.

12. The electrical machine as claimed in claim 1, characterized in that an inside radius ($r_2$) of the blade support ring (2) is at least twice as large as a smallest inside radius ($r_1$) of the insert part (5).

13. The electrical machine as claimed in claim 1, characterized in that the insert part (5) has an outside diameter which is larger than an inside diameter of the fan blades (4).

14. A fan impeller in an electrical machine as claimed in claim 1.

15. A method for producing a fan impeller as claimed in claim 14, in which method the insert part (5) is inserted into a mold, the material of the blade support ring (2) is then injection-molded in an injection-molding process and plastic material spreads over the passage openings (8) in the insert part (5) and forms the fan blades.

16. The method as claimed in claim 15, characterized in that the insert part (5) is designed as a stamped part and the plastic material is injected on a side of the insert part (5) which is averted from the stamped burr on the insert part (5).

* * * * *